(12) United States Patent
Perlman

(10) Patent No.: US 9,917,891 B2
(45) Date of Patent: Mar. 13, 2018

(54) DISTRIBUTED IN-ORDER LOAD SPREADING RESILIENT TO TOPOLOGY CHANGES

(71) Applicant: Intel Corporation, Santa Clara, CA (US)

(72) Inventor: Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 974 days.

(21) Appl. No.: 14/040,125

(22) Filed: Sep. 27, 2013

(65) Prior Publication Data

US 2015/0095404 A1 Apr. 2, 2015

(51) Int. Cl.
*H04L 29/08* (2006.01)

(52) U.S. Cl.
CPC ...... *H04L 67/1034* (2013.01); *H04L 67/1027* (2013.01)

(58) Field of Classification Search
CPC ......... H04L 45/22; H04L 45/00; H04L 45/28; H04L 45/02; H04L 69/329; H04L 29/12924; H04L 61/6063; H04L 67/02; H04L 69/16; H04L 69/162; H04L 69/163; H04L 69/165; H04L 69/40; H04L 45/16
USPC .......................................................... 709/203
See application file for complete search history.

(56) References Cited

U.S. PATENT DOCUMENTS

| | | | | |
|---|---|---|---|---|
| 6,112,249 A * | 8/2000 | Bader | ................. | G06F 11/2007 330/3 |
| 8,290,972 B1 * | 10/2012 | Deshmukh | ........ | G06F 17/30489 707/758 |
| 8,849,838 B2 * | 9/2014 | Wang | ................. | G06F 17/30979 707/721 |
| 9,148,293 B2 * | 9/2015 | McFate | ................. | G06F 9/5027 |
| 2009/0158290 A1 * | 6/2009 | Halasz | .................. | G06F 9/5027 718/104 |
| 2009/0271515 A1 * | 10/2009 | Iyengar | ............... | H04L 67/1008 709/226 |
| 2013/0265875 A1 * | 10/2013 | Dyke | .................. | H04L 67/1002 370/235 |

OTHER PUBLICATIONS

IBM Knowledge Center; The evolution of SNA; (http://www-01.ibm.com/support/knowledgecenter/zosbasics/com.ibm.zos.znetwork/znetwork_154.htm).*

* cited by examiner

*Primary Examiner* — Tu Nguyen
(74) *Attorney, Agent, or Firm* — Law Office of R. Alan Burnett, P.S

(57) ABSTRACT

Methods, apparatus, and systems for distributing network loads in a manner that is resilient to system topology changes. Distribution functions and associated operations are implemented on multiple load splitters such that if a load splitter becomes inoperative, another or other load splitters can forward packets corresponding to flows previously handled by the inoperative load splitter without requiring flow state synchronization to be maintained across load splitters. The distribution functions are implemented in a manner that distributes packets for the same flows to the same servers through system topology changes, addressing both situations when servers fail and/or are taken off-line and when such servers or replacement servers are brought back on-line. The techniques are facilitated, in part, via use of redistributed flow lists and/or Bloom filters that are marked to track redistributed flows. A novel Bloom filter recycle scheme is also disclosed.

30 Claims, 12 Drawing Sheets

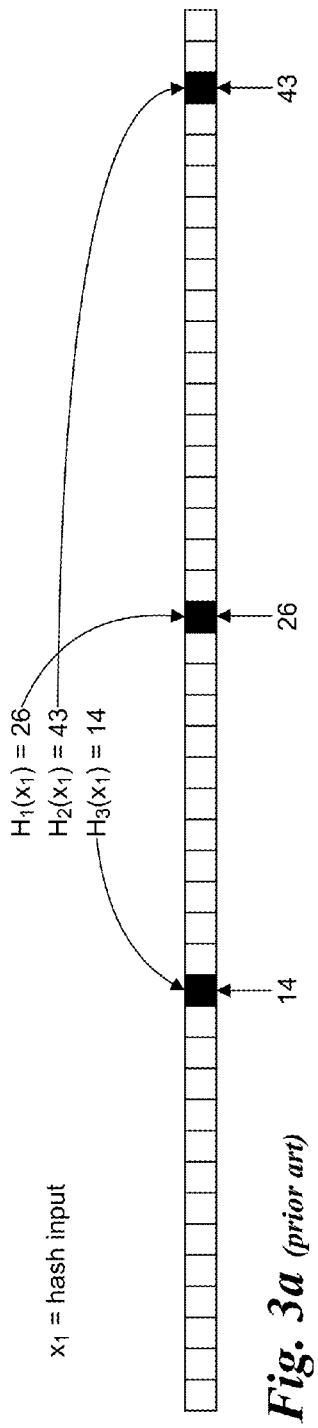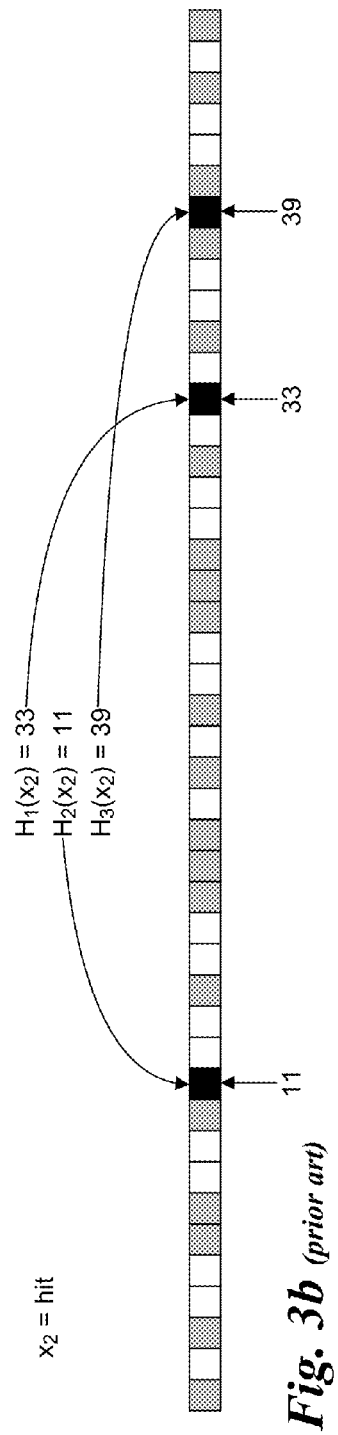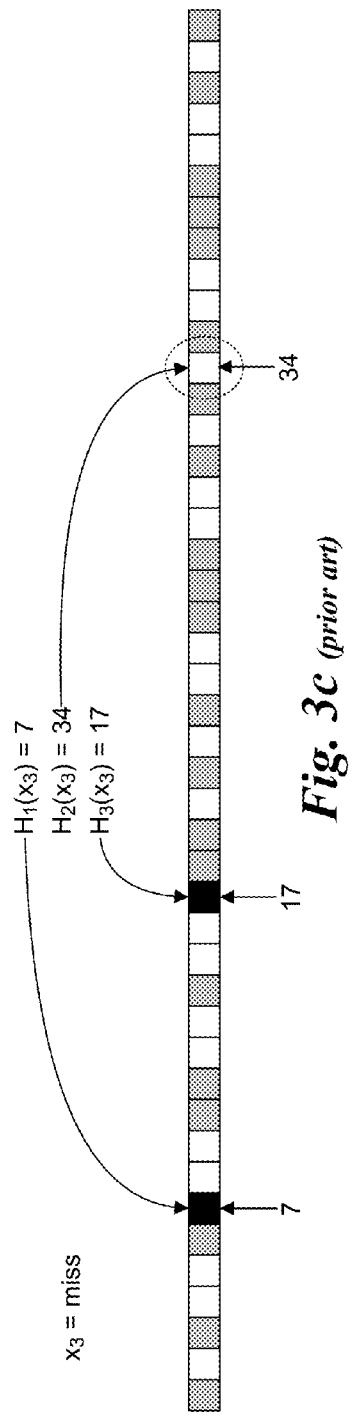

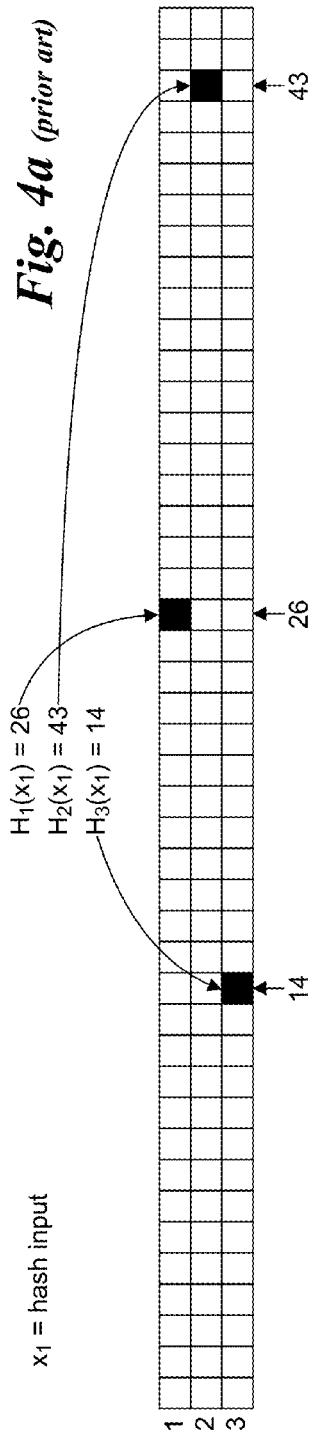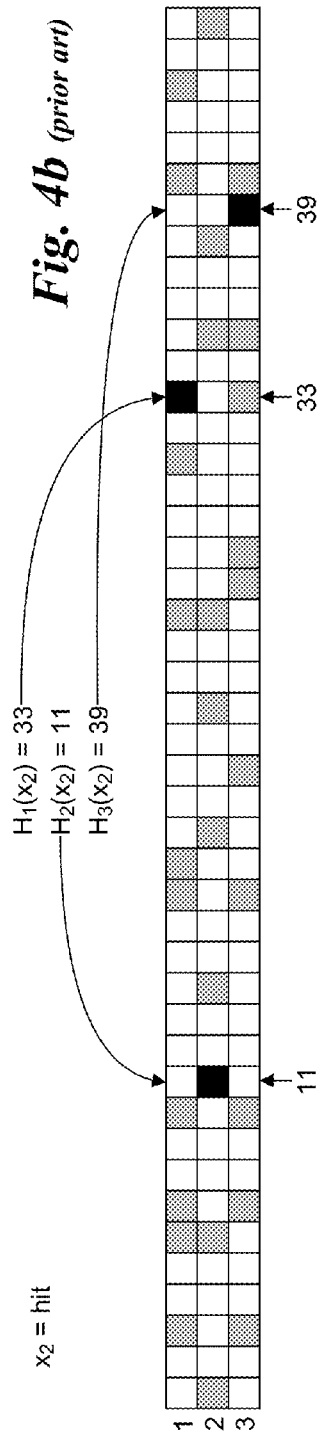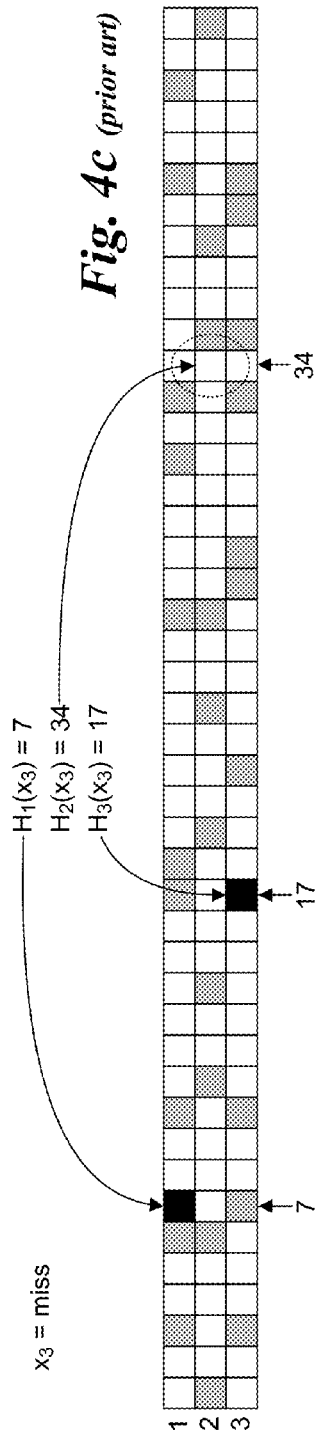

DISTRIBUTED IN-ORDER LOAD SPREADING RESILIENT TO TOPOLOGY CHANGES

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (e.g., 4G) of mobile network data services is expected to significantly impact the utilization of land-line networks in the near future. The result of these and other considerations is that the utilization of computer networks is expected to continue to grow at a high rate for the foreseeable future.

A common architecture employed for cloud services and other on-line sites, such as ecommerce sites, social networking sites, content hosting sites, and news sites, uses a multi-tier architecture having a Web server front-end coupled to one or more tiers of servers, such as application servers and database or storage servers. The Web server tier itself may employ a load distribution scheme employing multiple levels in a fan-out model fashion. Load-spreading is also commonly deployed between Web server and application server tiers.

Technically, a Web server is more accurately called an HTTP (HyperText Transport Protocol) server. HTTP employs a request-response protocol using a client-server model. HTTP is a stateless protocol that was originally implemented such that a connection was closed after a single response pair. In HTTP 1.1 a keep-alive mechanisms was added, where a connection may be used for multiple requests; these connections are termed "persistent" connections. In addition, HTTP 1.1 introduced chunked transfer encoding to support data streaming using persistent connections.

Each server has its own network address, with public Web servers having public Internet Protocol (IP) network address that are encoded under IPv4 using a 32-bit addressing scheme or under IPv6 using a 128-bit addressing scheme. The Domain Name System (DNS) is used to map Web site URLs to their public IP addresses. Typically, there is only a single public IP address for the home pages of sites such as www.facebook.com and www.youtube.com. In order to handle the millions of requests received daily, these sites implement a load-spreading scheme under which each request is routed internally in the sites' private networks using one or more levels of fan out.

Early load-spreading schemes employed load-balancers or the like that used simple algorithms for balancing the incoming request across multiple servers. For example, in view of the original HTTP request/response expectation, a round-robin scheme or the like was employed under which if there was a 1-to-n load balancer, each server would handle every nth request. Under architectures that couple lower-tier application servers to higher tier servers in a tree-like hierarchy, a given application server may only be accessed via a single routing path. Thus, for streaming connections in these architectures, all packets corresponding to the connection within the host's private network are routed along the same path.

In contrast to private IP networks, the Internet is comprised of a large number of inter-connected public networks, and employs a very large number of switching elements such as switches, routers, bridges, etc. Under a fundamental concept of the Internet, packets may be routed between the same source and destination endpoints using different routes, thus providing resiliency if some of the switching elements become disabled, and enabling dynamic changes to the network topology. However, for streaming connections and the like, it is advantageous to route packets along the same route, both over the public Internet portion of a route and the private network portion of the route.

It is often preferable for packets associated with a flow to arrive in order at the destination. To facilitate this, routers and switches are typically configured to choose the same next hop for a given flow. Similarly, it is usually preferable that load balancers and load splitters be configured to send packets belonging to the same flow to the same server.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 3a-3c illustrate how a Bloom filter employing multiple hash algorithms and a single-dimension bit vector operates;

FIGS. 4a-4c illustrate how a Bloom filter employing multiple hash algorithms and respective bit vectors operates;

DETAILED DESCRIPTION

Figure 1A:
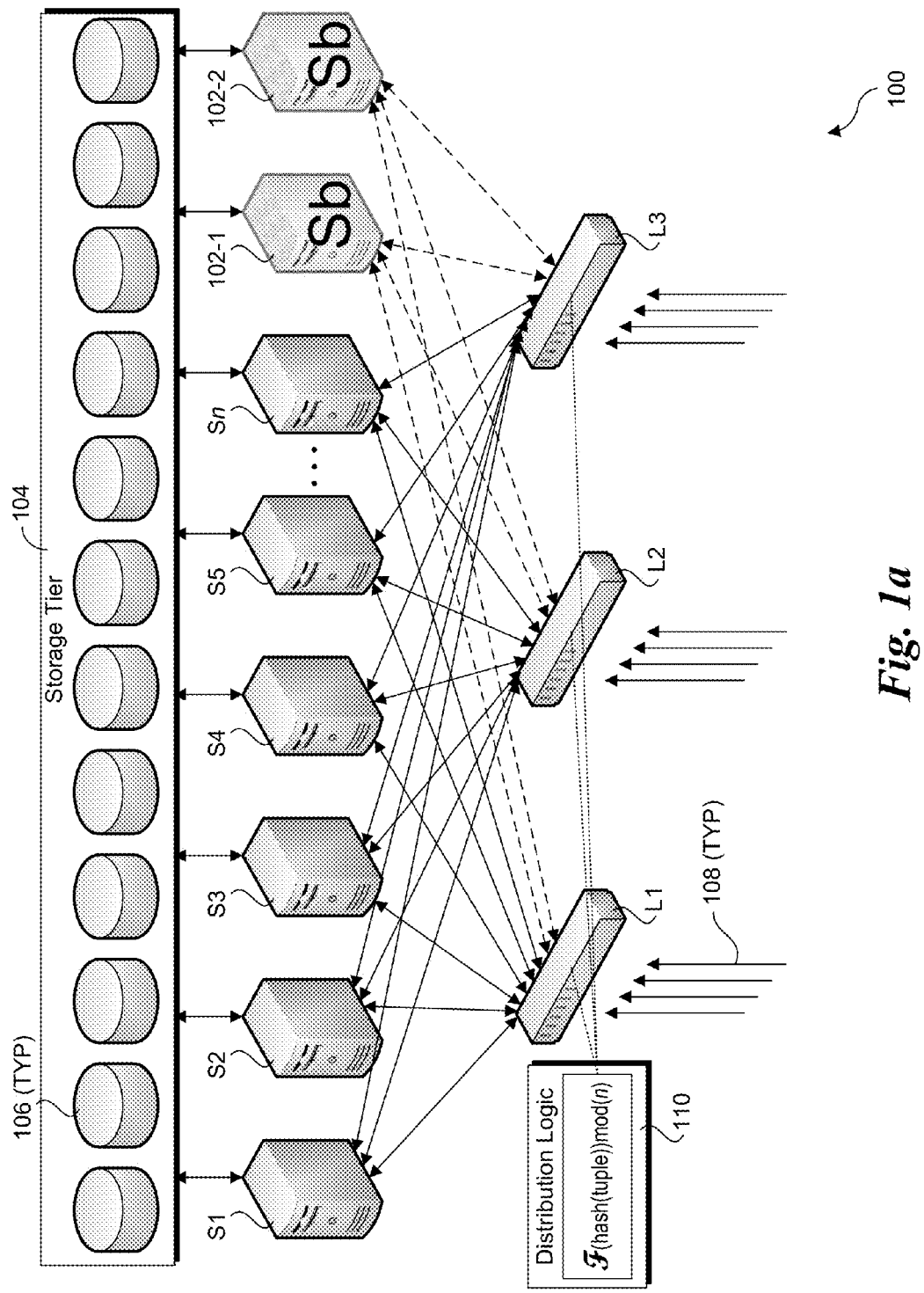
FIG. 1a is a schematic diagram of an exemplary system architecture employing multiple load splitters for distributing packets to a plurality of servers, which in turn provide access to data stored by devices in a storage tier.

Embodiments of methods, apparatus, and systems for distributing network loads in a manner that is resilient to topology changes are described herein. In the following description, numerous specific details are set forth, such as illustrative embodiments for load splitters, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, it is common in networks that packets associated with the same flow be routed along the same path. More particularly, load balancers, which may also be referred to as load splitters (as used herein), are configured to forward packets belonging to the same flow to the same server. For tree-like hierarchies under which front-end servers are connected to servers on other tiers, packets associated with a given service and the same flow should always (with high probability) be sent to the same server that is used to implement the service. For example, a cloud-based data upload or download may route packets along a path including a front-end Web server, an application server configured to service data file access requests, and a storage server on which the data is stored. Optionally, the Web server and application server functionality may be implemented on the same server. In connection with the data file request, a persistent connection is opened and data is streamed from or to the storage server using an application running on the application server in combination with use of HTTP data chunking implemented on the Web server. Since HTTP data chunking actually involves multiple requests/responses, each request is serviced by the same Web server and application server.

To support use of the same routing/forwarding paths, there are two basic mechanisms that are in used today. These mechanisms described here apply to load splitters, although similar mechanisms may be employed by other network elements (e.g., switches). Under a first mechanism, the load splitter keeps state: (flow identifier, server chosen to forward flow), for each current flow. This has two problems; one is that, especially with a Distributed Denial of Service (DDOS) attack, the state might become exhausted. The other problem is that if the server choice is arbitrary (say, choose the least loaded server at the time the flow starts), if network paths change and flows are routed to a different load splitter, the second load splitter will have no way of knowing the choices made by the first load splitter (without very expensive state synchronization between the load splitters).

The second mechanism employs a hash of selected field values in the packet, to make a stateless deterministic choice. This allows another load splitter to calculate the same choices. However, if the set of servers changes, all the flows will be hashed differently, so flows (not just the ones that were going to the now dead choice) will be unnecessarily moved.

In accordance with aspects of the embodiments disclosed herein, both of the aforementioned problems are addressed, enabling the network topology to change while ensuring that a given request is serviced to completion by the original application server or other server assigned to the request. In addition, the techniques are scalable, such that multiple load splitters may implement the same distribution logic and if one of those load splitters goes down, another load splitter can take over handling distribution of the flows previously handled by the load splitter that went down. Moreover, this can be accomplished in a manner that does not require expensive state synchronization between the load splitters.

Figure 2:
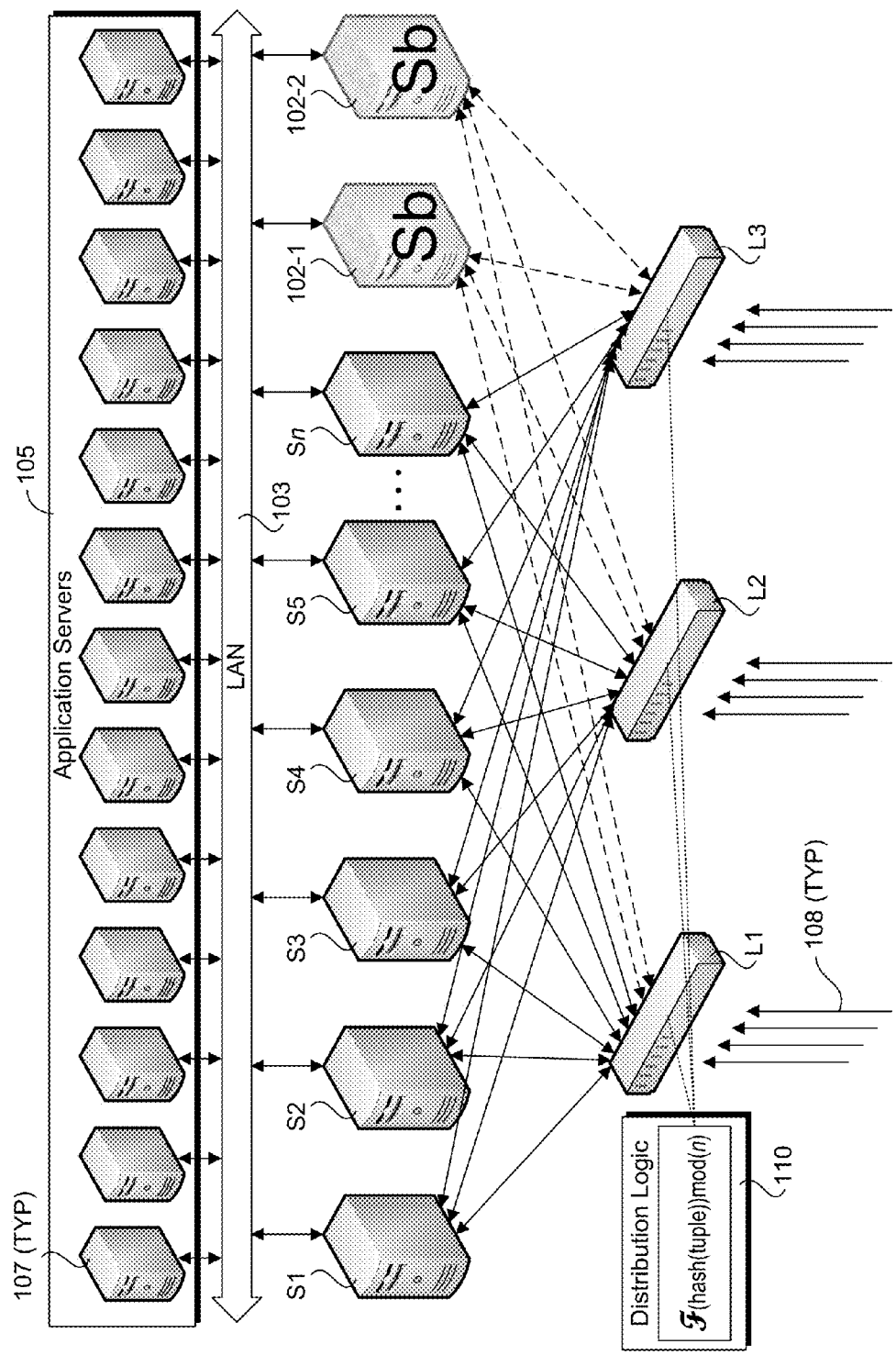
FIG. 2 shows a variation of the system architecture of FIG. 1a, wherein the servers coupled to the load splitters are connected to application servers in an application server tier via a LAN.

FIG. 1a depicts a system 100 including n operating servers S (labeled S1, S2, . . . Sn) and two standby servers 102-1 and 102-2 that are coupled to three load splitters L (labeled L1, L2, and L3). Each of servers S and standby servers 102 is also coupled to a storage tier 104 including a plurality of mass storage devices 106 and storage access servers or front-ends or the like (not shown) that provide access to data stored on the mass storage devices. The load splitters L1, L2, and L3 receive input requests 108 from clients external to the system via applicable network infrastructure (not shown for simplicity and clarity). For example, system 100 may be part of a cloud-based storage service that users access via the Internet using a URL portal. In another configuration illustrated by a system 200 in FIG. 2, servers S comprise Web servers that are coupled via a local area network (LAN) 103 to an application server tier 105 including a plurality of application servers 107. In addition, if servers S are implemented in an application server tier or other middle tier, input requests 108 may be received from another tier in system 100, such as a front-end Web server tier (not shown), or otherwise multiple load splitters are situated between tiers in a system architecture.

Each of load splitters L includes distribution logic 110 that is configured to route/forward incoming requests to servers S. More particularly, distribution logic 110 is configured such that all packets corresponding to a given flow are forwarded to the same server S used to service an associated request, including through system topology changes, unless that server becomes disabled or otherwise becomes unavailable during the flow. Under common terminology, servers that are available to support services are termed "on-line," "up," or "active," while servers that are not available are termed "off-line" or "down" or disabled, failed, etc. Other servers may be on standby, while technically being both on-line and operating (although at a reduced level), but not available to service requests. For purposes in this detailed description and the following claims, servers that are operating, on-line, and/or otherwise available to service requests are termed "available" servers, while servers that are down, off-line, disabled and/or otherwise are unavailable to service requests are termed "unavailable" servers.

Under the configuration of system 100 in FIG. 1a, n servers are available, while two servers are off-line in standby mode, as marked by 'Sb's. Accordingly, distribution logic 110 employs an n-way deterministic distribution function (e.g., an n-way hash function in one embodiment) to distribute incoming requests to the n available servers. In the illustrated example, a hash is made on a tuple of fields in each incoming packet header, such as a well-known 5-tuple hash for IP packet headers. This approach is commonly referred to as an k-tuple hash. Other well-known hash functions may also be used. For illustrative purposes, a remainder R of the k-tuple hash result is then calculated, using n as the divisor, wherein R identifies which of servers S to route the packet to. A corresponding lookup table (not shown) is employed to map distribution function results (e.g., remainder R) to the address of a corresponding server S, and the packet is then forwarded to that server. Since the tuple field values for all packets belonging to a given flow will be the same (by definition, under standard flow classification approaches), the hash calculation and remainder result will likewise always be the same, generating the same remainder R for all packets in the same flow.

Figure 1B:
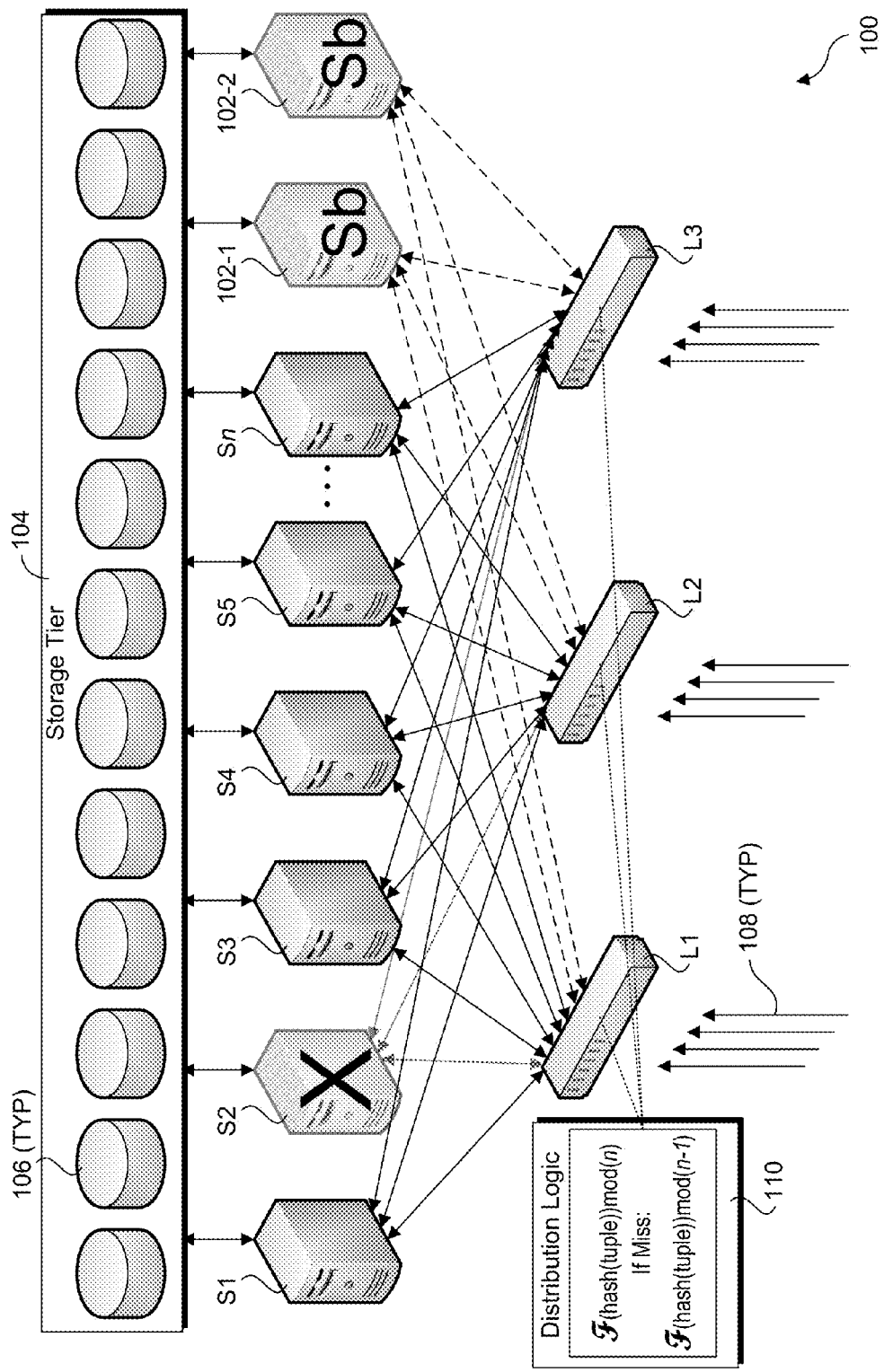
FIG. 1b shows a change in the system topology of FIG. 1a under which one of the servers had become unavailable.

FIG. 1b shows a configuration of system 100 under which server s2 has become inoperative or has otherwise become unavailable, as marked by an 'X'. As a result, n−1 servers S are now available. Under the conventional approach, the distribution logic in each of load splitters L1, L2, and L3 would be reconfigured to distribute new incoming request to the (now) n−1 available servers. For example, this could be accomplished using the same hash function as shown in FIG. 1a with modulus n replaced with n−1. While this facilitates the load-balancing objective by splitting the incoming requests 108 amongst the n−1 available servers S, the (n−1)-way deterministic hash function may produce a result R for a given flow that is different than the result obtained for the n-way deterministic hash function.

The foregoing is problematic in that incoming packets after the configuration change may be unnecessarily forwarded to a different server. Flows that were going to servers that remain up should still be routed to those servers, but flows that would have been routed to a server that is unreachable should be redirected to a different server. Also, once a server recovers, a flow that was redirected from that server should remain redirected to the alternate server until the flow completes. Typically, forwarding packets corresponding to a prior request to a different server will result in servicing of the request having to start over, or at least create additional overhead, depending on the type of service requested. While it is possible that a system may be architected to support mid-stream transfers without requiring restarts, this entails a great deal of overhead (e.g., state synchronization, additional state information on the load splitters, etc.) and is not scalable. Rather, techniques are implemented to ensure that packets associated with a given flow are forwarded to the same server regardless of configuration changes, as long as that server remains available throughout the flow. Under conventional practice, this is accomplished by using auxiliary information (e.g., flow identities and mappings, flow state data, etc.) and logic, which may be overwhelmed under a DDOS attack and/or otherwise increases load splitter complexity and cost.

Figure 1C:
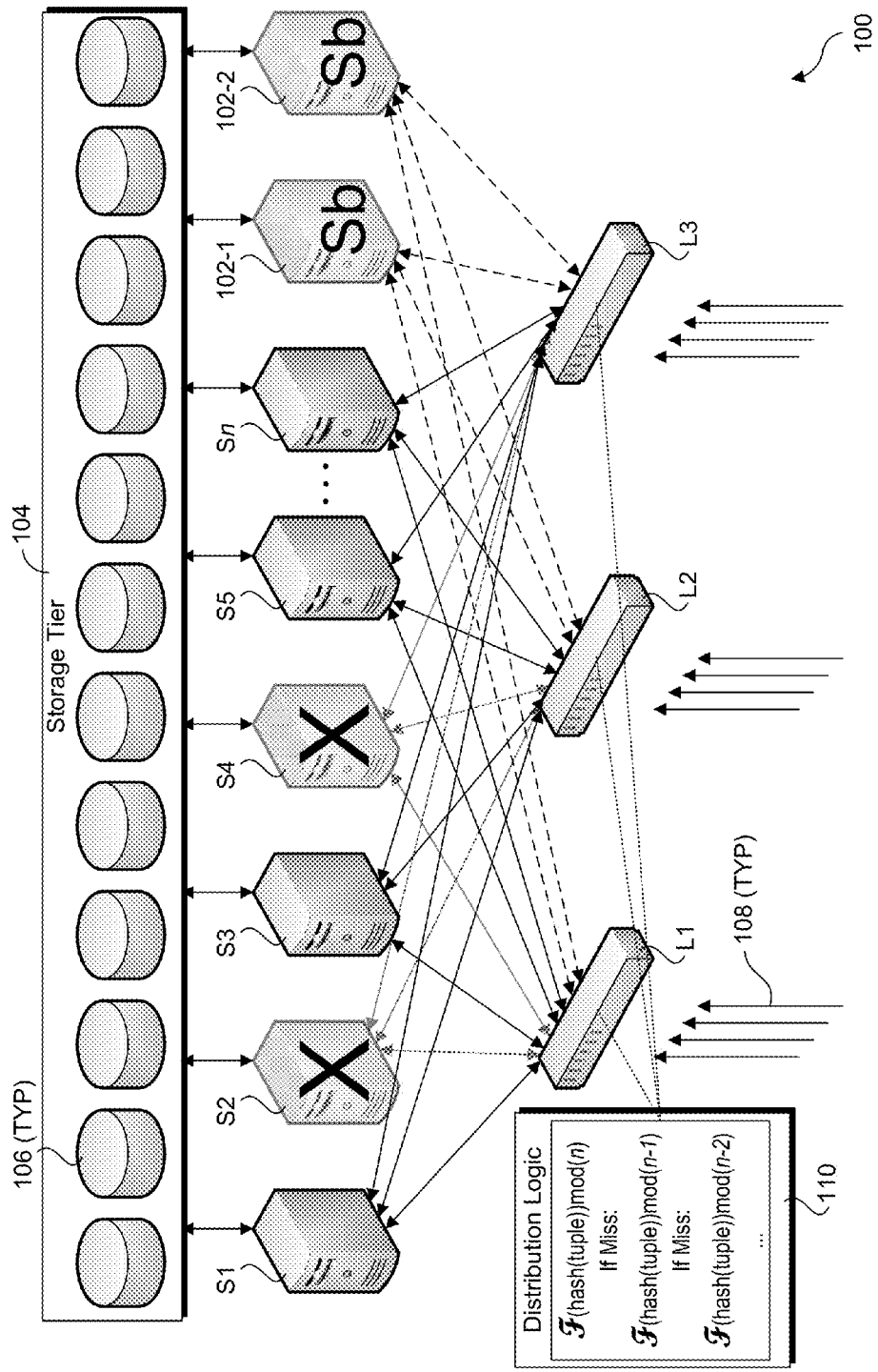
FIG. 1c shows a change in the system topologies of FIGS. 1a and 1b under which two of the servers have become unavailable.

In accordance with aspects of the embodiment illustrated in FIGS. 1a-c, a different, less-costly approach is used. Rather than change the deterministic distribution function from an n-way hash function to an (n−1)-way hash function, the same n-way hash function is used during a first distribution iteration. In one embodiment, each of load splitters L maintains a list of server S and their availability status. If the result of the n-way distribution function results in a mapping to an available server S (referred to as a 'hit'), the packet is simply forwarded to that server. However, if the n-way distribution function results in a mapping to an unavailable server (referred to as a 'miss'), such as server S2 in FIG. 1b, a second (n−1)-way deterministic distribution function is performed, which will result in the packet being distributed to one of the n−1 servers S that are available. As further shown in FIG. 1c, if the (n−1)-way distribution function results in another miss, a third (n−2)-way distribution function is performed. If the (n−2)-way distribution function results in a miss, a fourth (n−3)-way distribution function is performed, with this pattern continuing until the distribution function result is mapped to an available server.

The foregoing scheme ensures that packets corresponding to an existing flow will be forwarded to the same server to which the flow was originally assigned via the n-way distribution function corresponding to the original system 100 configuration shown in FIG. 1a (as long as that server is available). Moreover, it achieves this outcome without requiring the load splitters to maintain the level of flow state and mapping information required by the conventional approach. In addition, this scheme is more resilient to DDOS attacks, since it doesn't require the same level of state information to be kept for each flow.

While the technique illustrated in FIGS. 1a-c and discussed above enables packet flows to be distributed to the same servers without requiring significant levels of flow tracking information, it doesn't address distribution when the number of available servers increases as a result of a (previously) unavailable server being brought back on-line (and thus becoming available again). For example, such an increase could occur if either of inoperative servers S2 or S4 in FIGS. 1b and 1c are brought back on-line.

Suppose that server S2 is brought back on-line, and is available to service incoming requests again. While server S2 was unavailable, one or more load splitters L (as applicable) may have assigned flows that would normally have hashed to server S2 (presuming the original n servers were available) to one or more other servers S. It would be desirable if the load splitters 104 could start assigning flows corresponding to new requests to server S2, but not move existing flows that were redistributed to another server while server S2 was unavailable. Therefore, each load splitter 104 should be able to identify flows that it assigned to other servers while server S2 was unavailable, and enforce a flow distribution mechanism that forwards packets corresponding to the redirected flows to the server to which each redirected flow was redirected while S2 was unavailable, until that flow completes. As used herein, the flows that have been forwarded to other servers are referred to as "redistributed" flows, since they have been forwarded to a different server than the server identified by the initial iteration of the distribution function for the packet (in other words, the packets had to be redistributed from an unavailable server to another server).

Under respective embodiments, each load splitter maintains one or more lists of redistributed flows, employs one or more Bloom filters, or employs a combination of the two, using a list or table having a predetermined or variable size and then employing the Bloom filter when there is no more room to add additional redistributed flows to the list/table. When a flow hashes to server S2, the load splitter handling the packet checks to see if it corresponds to a flow in the list (or a flow marked by a Bloom filter) of flows that were redistributed to another server S when server S2 was unavailable. If a flow is in the list, then a timer associated with when a packet from the flow was last seen is updated, and the flow is redirected according to the redistributed result. For the current/next Bloom filter scheme discussed below, if the flow is in the current Bloom filter, then the corresponding bits are set in the next Bloom filter, and the flow is redirected. If the flow is neither in the list or the Bloom filter, it is sent to that server identified by the distribution function.

Figure 1D:
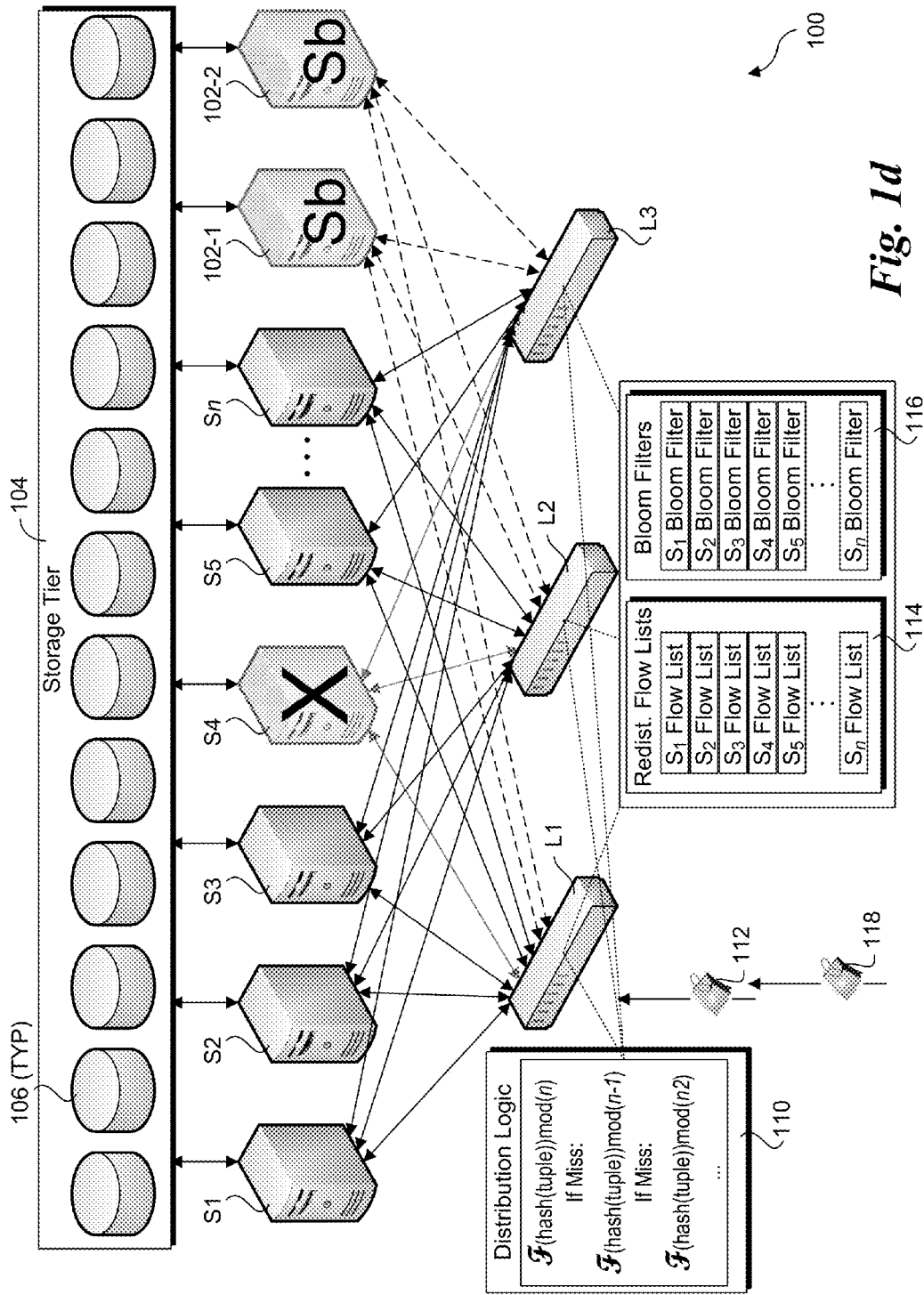
FIG. 1d shows the system topology return from the configuration of FIG. 1c to the configuration of FIG. 1b by bringing one of the unavailable servers back up.

Suppose the system 100 configuration is that shown in FIG. 1d, while the prior configuration (before server S2 is brought back on-line) is that shown in FIG. 1c. A new packet 112 is received at load splitter L1, which maintains a redistributed flow list 114 and/or Bloom filters 116. In the illustrated embodiment, redistributed flow list 114 stores a list of redistributed flow entries for each server S, or, optionally, for each server that was recently unavailable. In one embodiment redistributed flows are identified by their FlowID. Generally, the FlowID for a given flow may be determined using any of several well-known techniques for defining and determining FlowID's, such as performing a hash function on multiple packet header field values, e.g., as used in the aforementioned n-tuple hash, or simply concatenating multiple field values. In one embodiment the hash function is similar or identical to that used for flow distribution, but without the modulus operation. For example, in one embodiment the distribution function is simply a modulus operation performed on the packet's associated FlowID. As discussed below, the FlowID for a packet is typically performed during packet classification. Moreover, packets may be buffered such that their (already determined) FlowIDs can be retrieved, removing the need for performing a similar hash function in the flow distribution function.

Continuing with the handling of packet 112, suppose an n-way distribution hash on packet 112 results in the packet being forwarded to server S4, which is unavailable. As before, a second (n−1)-way distribution hash will be performed, and repeated, as necessary, until the distribution hash results in the packet being forwarded to an available server. Now suppose an n-way distribution hash on a packet 120 results in the packet being forwarded to server S2. Since this server has been recently unavailable, there may be one or more entries in rehashed flow list 114 or indicia in one of Bloom filters 116 identifying one or more previous flows that would have been distributed to server S2 if it was available, but required one or more rehashes, resulting in the flow or flows being redistributed to a different server or servers.

In consideration of the potential for the packet being associated with a redistributed flow, in one embodiment, a lookup of redistributed flow list 114 is performed for each received packet. Since the redistributed flow list may be stored as a table, a corresponding query against the table may be performed using, e.g., a ServerID corresponding to server S2 queried against an index containing ServerID values (or simply a column containing ServerID values), or a FlowID is calculated or retrieved and used as an input value for the look-up. Additional iterations of the distribution function may need to be performed, depending on the number of previously unavailable servers that have been brought back up or replaced. A more generalized process for handling various server availability configurations is discussed below with reference to flowchart 600 in FIG. 6.

Figure 1E:
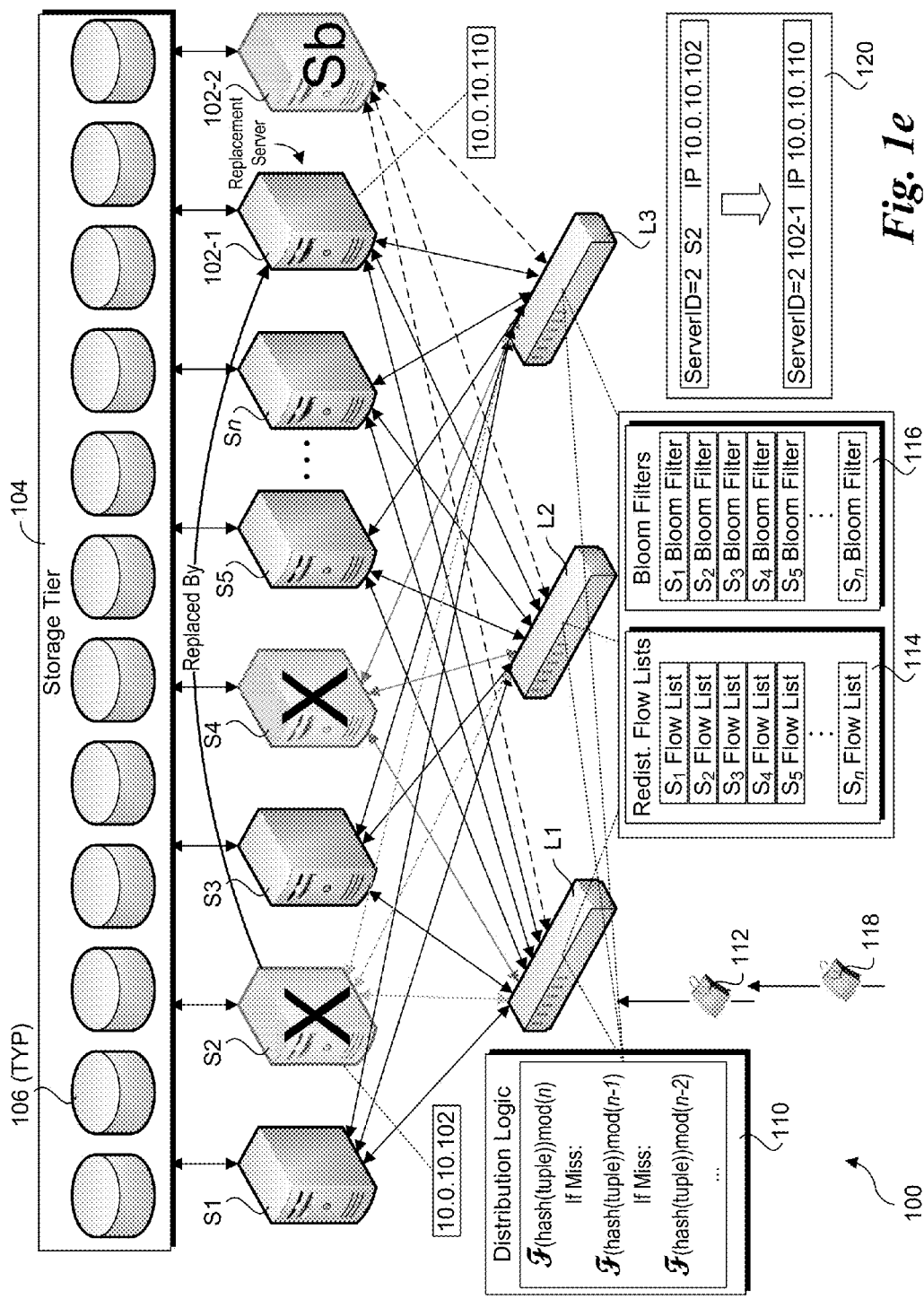
FIG. 1e shows a system topology under which a failed server has been replaced by a standby server.

In response to a server failure or the like (e.g., taken off-line for maintenance, reconfiguration, etc.), it is common practice to replace the failed or otherwise unavailable server with a standby server. An example of such a replacement is illustrated in FIG. 1e, wherein failed server S2 is replaced by standby server 102-1. Generally, there will be some period of time between when a server becomes unavailable and when a replacement server is configured and up and running and made available to take over services and other operations provided by the unavailable server. During this time, packet flows may be redistributed to other servers, as before. However, rather than the failed server (e.g., server S2) being brought back up and made available to again receive flows, those flows will now be forwarded to the replacement server.

In one embodiment, it is desired that implementation of a server replacement is transparent to as much of the system as practical. In the embodiment illustrated in FIG. 1e, a server mapping table 120 is maintained that maps ServerIDs to physical or virtual servers and their corresponding IP addresses. Optionally, servers could be mapped to MAC addresses for systems employing layer-2 forwarding. From the perspective of one embodiment of distribution functions, the functions output an integer, and the flow is distributed to the server associated with the integer using the IP address of that server. A server replacement is facilitated, in part, by updating the mapping information for the server that is to be replaced, such that the ServerID is now mapped to the IP address of the replacement server. As shown in FIG. 1e, the IP address for ServerID 2 is updated from 10.0.10.102, which is assigned to server S2, to 10.0.10.110, which is assigned to replacement server 102-1.

As discussed above, in some embodiments a Bloom filter is used to track flows that have been redistributed. A Bloom filter is a space-efficient data structure that is used to test probabilistically whether an element is a member of a set. The simplest form of Bloom filter employs a single hash algorithm that is used to generate bit values for a single row or column of elements at applicable bit positions, commonly referred to as a single-dimension bit vector. Another Bloom filter scheme employs multiple hash algorithms having bit results mapped to a single-dimension bit vector. Under a more sophisticated Bloom filter, the bit vectors for each of multiple hash algorithms are stored in respective bit vectors, which may also be referred to as a multi-dimension bit vector.

An example of a Bloom filter that is implemented using multiple hash algorithms with bit values mapped into a single-dimension bit vector is shown in FIGS. 3a-3c. In this example, there are three hash algorithms, depicted as $H_1(x)$, $H_2(x)$ and $H_3(x)$, where element x is the input value. For a given input $x_1$, the result for each of hash algorithms $H_1(x_1)$, $H_2(x_1)$ and $H_3(x_1)$ is calculated, and a corresponding bit is marked (e.g., set to 1) at the bit position corresponding in the hash result. For example, as shown in FIG. 3a, the result of hash function $H_1(x_1)$ is 26, $H_2(x_1)$ is 43, and $H_3(x_1)$ is 14. Accordingly, bits at positions 26, 43, and 14 are set (e.g., the bit values are flipped from '0' (cleared) to '1' (set)). This process is then repeated for subsequent input $x_i$ values, resulting in the bit vector shown in FIG. 3b, wherein the bits that are set are depicted in gray and black. FIG. 3b also illustrates the result of a hit for input $x_2$ (bits depicted in black). A hit is verified by applying each of the Bloom filter's hash algorithms using $x_2$ as the input value (also referred to as a query for element $x_2$), and then confirming whether there is a bit set at the bit position for each hash algorithm result. For example, if there is a bit set for the position for each hash algorithm result, the outcome is a hit, meaning there is a high probability (depending on the sparseness of the bit vector) that the element $x_k$ corresponds to a previous input value $x_j$ for which the hash algorithms were applied and corresponding bits were set.

FIG. 3c shows an outcome of a miss for input $x_3$. In this case, one or more bit positions in the bit vector corresponding to the hash algorithm results are not set. FIGS. 3b and 3c illustrate a couple of features that are inherent to Bloom filters. First, Bloom filters may produce false positives. This is because the bit vector that is formed by evaluating the hash algorithms against a number of inputs x is a union of the individual results for each input x. Accordingly, there may be a combination of set bit positions that produce a hit result for a test input $x_t$ as applied against the Bloom filter's bit vector, while the input $x_t$ was not used to generate the bit vector. This is known as a false positive. Another inherent feature of Bloom filters is they do not produce false negatives. If evaluation of an input $x_t$ as applied to a Bloom filter's bit vector results in a miss, it is known with certainty that $x_t$ is not a member of the set of previous Bloom filter inputs.

FIGS. 4a-4c illustrate an example of a Bloom filter that maintains a separate table row (and one-dimensional bit vector) for each Bloom filter hash algorithm. Although each row is depicted as having the same length, it is possible that the different hash algorithms will produce bit vectors of different lengths. As hash algorithms are evaluated against input x values (e.g., against $x_1$ in FIG. 4a), a corresponding bit is set at the bit position for the table row corresponding to the hash algorithm result. As before, input $x_2$ results in a hit (whether a true hit or a false positive), while input $x_3$ results in a miss.

Since a hash algorithm may produce the same result for two or more different inputs (and thus set the same bit in the Bloom filter bit vector), it is not possible to remove individual set members (by clearing their bits) while guaranteeing that bits corresponding to other input results will not be cleared. Thus, the conventional Bloom filter technique is one-way: only additional bits may be added to the bit vector(s) corresponding to adding additional members to the set.

The problem with adding additional set members is a reduction in bit vector sparseness, resulting in an increase in false positives, as discussed above. At the same time, it is desired to continue to add new set members on an ongoing basis to efficiently store indicia that facilitates determination to whether a flow has been redistributed. In accordance with aspects of some embodiments employing Bloom filters, a novel technique is provided that both enables Bloom filters to track redistributed flows while keeping the Bloom filters sparse.

Figure 5:
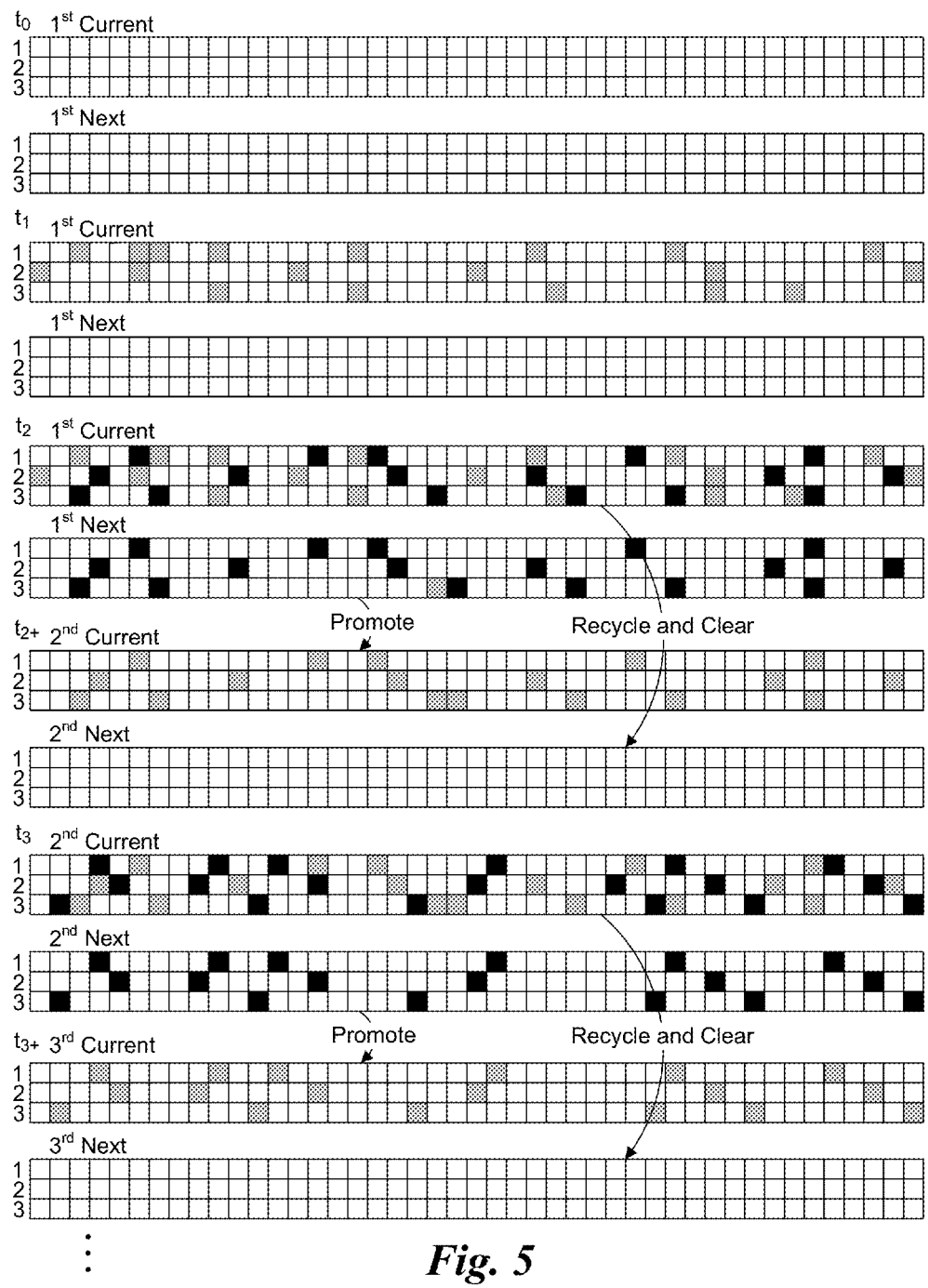
FIG. 5 show a time flow of bit vector data for a pair of Bloom filters used to illustrate an implementation of a Bloom filter scheme employing a current and next Bloom filter, according to one embodiment.

In further detail, one embodiment of the technique is implemented as follows. With reference to FIG. 5, two Bloom filters are maintained for each single Bloom filter that would be employed under the conventional approach. For example, in one embodiment there is a pair of Bloom filters maintained per server S. The purpose of the Bloom filters is to keep track of redirected flow that were redirected from server S to another server. According to one aspect, the status of the Bloom filters is switched in a cyclical manner, with the status of one of the Bloom filters termed the "current" Bloom filter, while the status of the other Bloom filter is termed the "next" Bloom filter. When server S is down, the same bits are set in both the current and next Bloom filters as new flows are redistributed (or the same bits are added to the next Bloom filter for packets belonging to flows that are already marked in the current Bloom filter), while hit testing is applied only against the current Bloom filter. When server S is up, the current Bloom filter is only used to test whether a packet belongs to a redirected flow; no new bits are added to the current Bloom filter. Only if a packet belongs to an ongoing redirected flow, are the Bloom filter bits for that packet set in the next Bloom filter, as explained in further detail below.

Initially, all bits in a first current Bloom filter and a first next Bloom filter are cleared, as shown in FIG. 5 at time $t_0$. For just these first current and first next Bloom filters, new set bits (depicted in gray) are added to only the first current Bloom filter as new redistributed flows are processed during a first time period. At this point (time $t_1$), new set bits are added to both the first current and first next Bloom filters, for a second time period as depicted by the time difference between times $t_1$ and $t_2$. In one embodiment, the first and second (and subsequent) time periods are the same. The set bits that have been added to the bit vectors in the first current and first next Bloom filters during the second time period are shown in black. Since set bits have been added to the bit vector(s) in the first current Bloom filter for a longer period of time than the first next Bloom filter (and populating bits in next and current Bloom filters are offset in time), the bit vector(s) in the first current Bloom filter (and subsequent current Bloom filters) will always be less sparse than in the first next Bloom filter (and subsequent next Bloom filters), unless no set bits are added to either Bloom filter during a given cycle period.

At this stage, as depicted at time $t_{2+}$ (the '+' indicating just after time $t_2$), the first next Bloom filter is promoted to become the second current Bloom filter, while the first Bloom filter is recycled and reused as a second next Bloom filter. In conjunction with recycling of a current Bloom filter, its bit vector(s) are cleared. If set bits have been added to both the first current and the first next Bloom filters during the time period between times $t_1$ and $t_2$, when the first current Bloom filter is recycled the new current Bloom filter bit vector(s) will include at least some bits that are set, while the new next Bloom filter bit vector(s) will include no set bits, as shown in FIG. 5.

The foregoing Bloom filter promotion and recycling process is then repeated on an ongoing basis, with the current Bloom filter being recycled and replaced with the next Bloom filter. For example, the sequence from the second current and next Bloom filters to the third current and next Bloom filters is illustrated in FIG. 5 by the Bloom filter bit vectors shown at times $t_3$ and $t_{3+}$.

Use of the combination of a redistributed flow list(s) and a Bloom filter(s) may provide advantages over redistributed flow lists or Bloom filters alone. Since each entry in a redistributed flow list corresponds to a respective redistributed flow, there is no possibility of false positives, unlike with Bloom filters. As discussed above, Bloom filters provide a very efficient mechanism for verifying whether an entry is a member of the set of entries marked by the Bloom filter bit vector data. By combining the two approaches, redistributed flow lists may be used for primary hit testing, with FlowIDs or other indicia added to a redistributed flow list if space is available, while Bloom filters may be used for overflow situations (e.g., when the redistributed flow list space is exhausted). Unlike Bloom filters, entries can and preferably should be removed from redistributed flow lists when they are no longer relevant, such as when a flow completed. Indication of flow completion may be determined using one of several well-known techniques, and in response to determining a redistributed flow has completed in one embodiment the FlowID or other indicia for the flow is removed from the redistributed flow list.

There may also be instances where it is advantageous to "add" existing redistributed flows that are marked via a Bloom filter to a redistributed flow list. If a first packet for a redistributed flow is redistributed while the redistributed flow list for an unavailable server is full, corresponding indicia (set bits) for the flow will be added to a Bloom filter associated with the server (or both a current and next Bloom filter, if the Bloom filter recycle scheme is used). If redistributed flows that have FlowIDs or other indicia in the redistributed flow list complete, those entries may be removed from the list, freeing up space to add new entries. If a packet corresponding to an existing redistributed flow that is marked in a Bloom filter(s) but is not in the redistributed flow list and there is room in the list, corresponding indicia may be added to the redistributed flow list, while the Bloom filter(s) bits are not affected. Eventually, the bits corresponding to the flow in the Bloom filter will age out, leaving only indicia relating to the flow in the redistributed flow list.

In one embodiment, the following technique is used. In response to a packet for a flow hashing to a server Si, the following operations are performed.
   a) Check the packet against the list of redistributed flows. If it's listed there, then redistribute the flow as directed in the list (or do the rehash if you haven't marked the list entry with which server that specific flow was redirected to).
   b) Else (not in the list), check it against the Bloom filter. If the Bloom filter indicates the flow is not there, then forward the flow to server Si.
   c) Else (not in the list, but is in the current Bloom filter), then (without modifying the next Bloom filter), add indicia for that specific flow (e.g., FlowID) to the list of redistributed flows.

Eventually, if you're lucky, the only flows redirected from Si will be a few very long-lived flows, and after recycling the Bloom filters one or more times, the Bloom filters will remain all zeros, since indicia identifying all of the long-lived flows will be in to the redistributed flow list.

Figure 6:
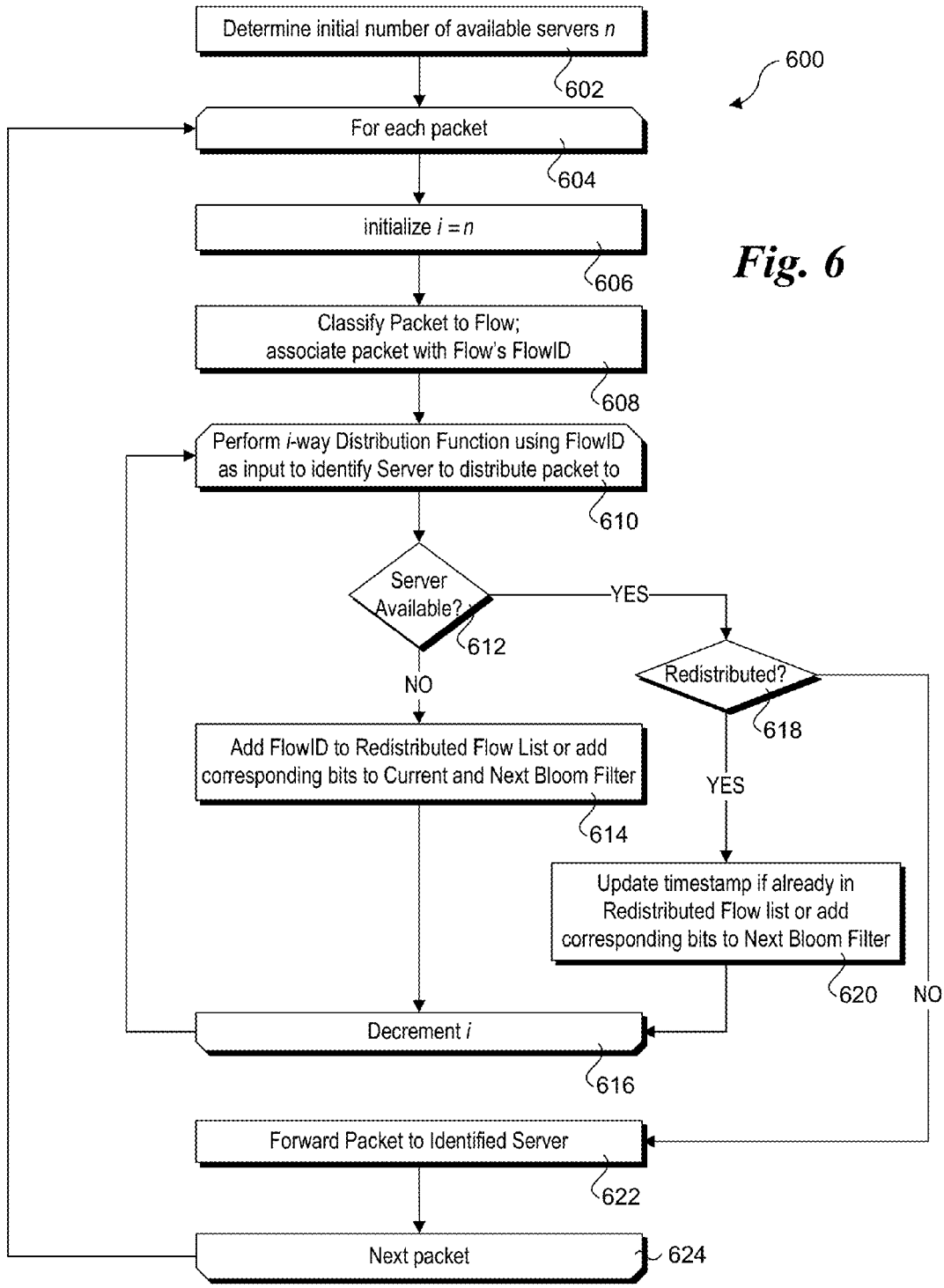
FIG. 6 is a flowchart illustrating operations and logic for facilitating a general packet distribution/redistribution scheme in accordance with the embodiments shown in FIGS. 1a-1f, according to one embodiment.

FIG. 6 is a flowchart 600 illustrating operations and logic for facilitating a general packet distribution/redistribution scheme using architecture 100 and in accordance with the embodiments shown in FIGS. 1a-1f. First, in block 602 an initial number of available servers n is determined. As depicted by start and end loop blocks 604 and 624, the operations and logic depicted within the flowchart's outer loop are performed on each packet that is received by a load splitter and belongs to a flow that is to be forwarded to one of servers S. In a block 606, an integer count i is initialized to n; i is used as an integer variable that is counted down with each iteration of the distribution function in an inner loop delineated by start and end loop blocks 610 and 616.

In a block 608, a flow classification operation is performed to classify the packet. Flow classification is well-known in the art, and a variety of different flow classification schemes may be used, include the n-tuple hash classification scheme discussed above. In the illustrated embodiment, a FlowID is determined for each flow, and packets are associated with flows using FlowIDs. For example, packets may be buffered in a manner that links each packet to its FlowID through a pointer or other type of linking mechanism. Preferably, the technique for deriving the FlowID should guarantee that each flow has a unique FlowID (within expected operating parameters).

As referenced above, start and end loop blocks 610 and 616 delineate an inner loop that is performed iteratively until the loop exits to a block 622. In further detail, in start loop block 610 an i-way distribution function using the current value of is implemented using the packet's FlowID as the function input to identify a server S to which the packet should be distributed. In decision block 612, a determination is made to whether the identified server is an available server. If the identified server is unavailable, the packet cannot be forwarded to it. Thus, the answer to decision block 612 is NO, and the logic proceeds to a block 614 in which the FlowID is either added to the redistribution flow list for the identified unavailable server or corresponding bits are added to the Current and Next Bloom filters. In one embodiment, FlowID are added to the unavailable server's redistribution flow list if there is available space to add new entries, and if there is not available space then applicable bits are marked (added) to the Current and Next Bloom filters. The logic then proceeds to end loop block 616 in which i is decremented by 1, and loops back to start loop block 610 to perform a next i-way distribution function using the packet FlowID as the function input, wherein with each loop iteration i is reduced by 1.

Returning to decision block 612, if the identified server is an available server, the answer is YES, and the logic flows to a decision block 618 in which a determination is made to whether the packet corresponds to a redistributed flow. In one embodiment, this determination is performed by using the packet's FlowID as a lookup for the redistribution flow list for the identified server to check whether the FlowID is in the list. If the lookup check results in a miss, then a second check is performed by using the FlowID as an input to a hit test against the Current Bloom filter. If either the redistribution flow list check or the Current Bloom filter check results in a hit, the packet belongs to a redistributed flow (YES result for decision block 618), and the logic proceeds to a block 620 in which the timestamp for the FlowID is updated to reflect a current time if the FlowID is in the redistributed flow list (the timestamp being indicative of the most recent packet that redistributed flow), or, if not in the list, corresponding bits derived from the FlowID are added to the bit vector data for the Next Bloom filter; there is no need to add these bits to the Current Bloom Filter, since they would have been added previously for an earlier packet in the flow in block 614. The logic then proceeds to end loop block 616, causing i to be decremented by 1 and the next iteration of the loops is began at start loop block 610.

This loop iteration continues until the server identified by the i-way distribution function is an available server for which the packet's flow has not been redistributed, resulting in a YES at decision block 612 and a NO at decision block 618. This causes the logic to exit the loop and proceed to block 622, wherein the packet is forwarded to the identified server. This completes processing of the packet, and the logic loops back from end loop block 624 to start loop block 604 to begin processing the next packet that is received by the load splitter.

In one embodiment, the timestamps for the FlowIDs in the redistribution flow lists are checked on a periodic basis to determine if the difference between a current time and a FlowID timestamp exceeds some predetermined value. This time difference represents the time since the last packet for a given redistributed flow has been received; exceeding the predetermined value indicates the flow has completed. As a result, the FlowID is removed from the redistributed flow list for the applicable server.

Figure 7:
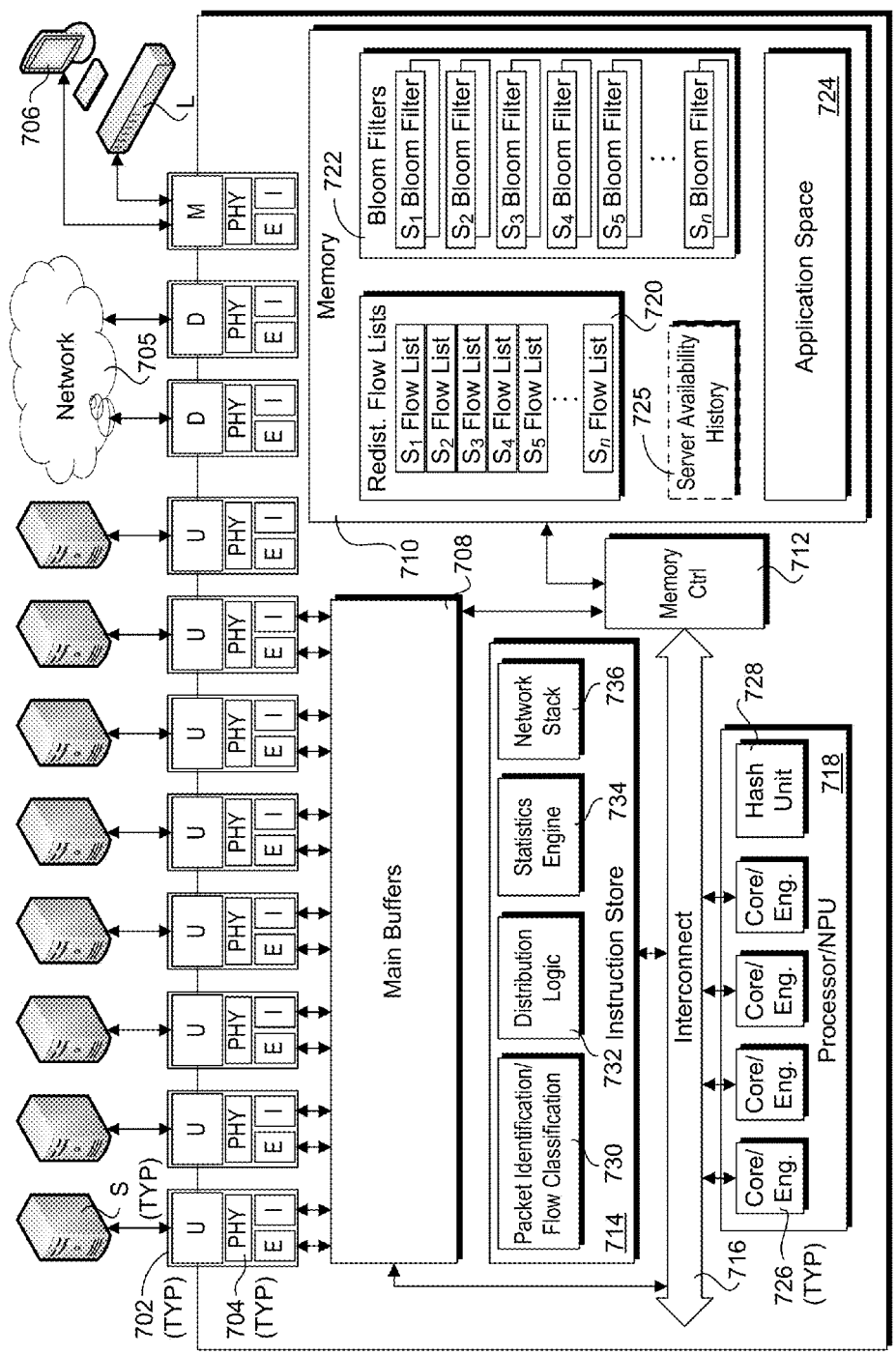
FIG. 7 is a schematic diagram illustrating an architecture for an apparatus configured to implement aspects of the embodiments disclosed herein.

FIG. 7 shows a schematic block diagram architecture of an exemplary load-splitter 700 that may be configured to implement aspects of the embodiments disclosed herein. Load-splitter 700 includes a plurality of network ports 702, each including a Physical (PHY) layer block 704, an egress buffer E and an ingress buffer I. Each network port 702 may also include other components that are well-known to those skilled in the networking arts and are not shown for simplicity and clarity. Each of the various network ports 702 include a block labeled U(pstream), D(ownstream), or M(anagement). When deployed and operating in a system in which the load splitter sits between a network 705 and a Web server tier, all or a portion of the Upstream ports will be connected to a server S, and one or more Downstream ports will be connected to network 705. In another system environment (not shown), load splitter 700 would be implemented between different server tiers, such as between a Web server tier and an Application server tier. Accordingly, the Upstream ports would be connected to servers in the Application server tier, while the downstream port(s) would be connected to server(s) in the Web server tier.

The Management port may generally be used for management purposes, such as downloading software from a management computer 706 or the like to the load splitter, configuring the load splitter, receiving data from the load splitter, etc. Optionally, management operations may be communicated via one of the Upstream or Downstream ports. In some embodiments, a Management port (or another port, not shown), may be coupled to another load splitter L, enabling multiple load splitters to share information, such as information pertaining to redistributed flows, Bloom filter data, statistical data, etc. It is noted that since a bit vector for a Bloom filter may be transferred to another load splitter as an integer, the overhead for sharing Bloom filter data between load splitters is very low.

Load splitter 700 further includes main buffers 708, memory 710, a memory controller 712, an instruction store 714, an interconnect 716, and a processor 718. Each of the egress and ingress buffers E and I are operatively coupled to main buffers 708, which may be implemented as part of memory 710, or may be implemented separately. Memory 710 comprises a type of Dynamic Random Access Memory (DRAM) that is accessed in the illustrated embodiment via memory controller 712. Optionally, processor 718 may have one or more integrated memory controllers or agents that are configured to support access to memory 710. During run-time operations, blocks of memory within the address space of memory 710 are allocated for various purposes, including storage of redistributed flow lists 720, Bloom filters 722, and one or more applications as depicted by application space 724. Data corresponding to server availability history 725 may also be stored in memory 710 if such data is tracked.

Processor 718 may generally comprise a general-purpose processor including one or more cores 726, or a special-purpose processor such as a Network Processing Unit (NPU) including a plurality of processing elements such as cores, micro-engines, or the like. Processor 718 may also include a hash unit 728, as illustrated. During run-time operations, instructions are loaded from instruction store 714 into application space 724 or directly into a cache level associated with a core or micro-engine 726 and executed on the core or micro-engine to effect operations for which the instructions are configured. By way of illustration and without limitation, instruction store 714 is depicted as storing instructions for multiple modules including a packet identification/flow classification module 730, distribution logic 732, a statistics engine 734, and a network stack 736. As is well-known, a load splitter or the like may generally include other instructions to effect other operations typically performed by load splitters; these instructions are not shown for clarity.

Packet identification/flow classification module 730 includes instructions that are configured to identify and/or classify incoming packets received from network 705. For example, a given packet may be associated with a FlowID based on information in the packet's header fields, as described above. Flow classification and or a distribution function may employ hash unit 728, which is a hardware-based component configured to perform hashing operations using one or more hashing algorithms. Optionally, all or a portion of the hashing algorithms may be implemented via execution of software instructions by processor 718, or via a separate hardware-based component (not shown).

Distribution logic 732 comprises instructions configured to implement the packet distribution and redistribution operations described herein. In some embodiments, this module is passed the FlowID for a packet and then distributes the packet to an appropriate server S using an applicable deterministic distribution function, such as the hash functions described herein. Distribution logic is also configured to implement redistributed flow lists 720 and Bloom filters 722. In some embodiments, the Bloom filters are implemented using the Current/Next Bloom filter recycling scheme discussed above with reference to FIG. 5.

Statistics engine 734 comprises instructions that are configured to implement statistical operations, including but not limited to collecting statistical information for packet flows and calculating various configuration parameters used by load splitter 700. For example, the statistics engine 734 may be configured to dynamically reconfigure the Bloom filter recycle frequency in response to processing of corresponding packet flow data. In addition or optionally, statistics engine 734 may be configured to receive statistics data from management computer 706 and/or from another load splitter. Also, statistics engine 734 may be configured to receive statistics data from one or more of servers S. For example, a management channel using a dedicated logical port may be employed for facilitating communication of non-traffic data between load splitter 700 and a server S.

Network stack 736 comprises instructions for communicating data that originates from load splitter 700 or has a destination of load splitter 700. For example, such communication may between load splitter 700 and management computer 706, another load splitter L, and/or a server S. In some instances, such communications may be implemented using a TCP/IP network stack, as is well-known. In addition, other well-known protocols may be used.

In one embodiment, instruction store 714 comprises a non-volatile storage device, such as Flash memory or a mass storage device (e.g., hard disk). Optionally, the instructions for one or more of the foregoing modules may be downloaded from management computer 706 or otherwise over network 705 in connection with initialization of a load splitter. In addition, updates to these modules may be downloaded via the Management port or another port.

In addition to implementing operations via execution of instructions on a general-purpose or special purpose processor, various operations performed by the embodiments discussed herein may be implemented using embedded logic or the like. Moreover, load splitter 700 may employ multiple processors, including a combination of one or more general-purpose processors and special-purpose processors. In addition, one or more of network ports 702 may employ embedded logic for performing one or more of the operations described herein. For example, an advanced single- or multi-port Network Interface Controller (NIC) that is configured to perform packet identification and/or flow classification may be used in place of these operations being performed via execution of instructions on processor 718.

Implementation of the distribution logic and associated operations according to the principles and teachings of the embodiments disclosed herein provide significant advantages over current techniques. For example, under a system architecture employing multiple load splitters in the same tier under which packets associated with the same flow may be received by two or more different load splitters, the conventional approach requires a significant level of flow state information to be synchronized across the load splitters. This flow state information will typically include state information related to each flow that is handled by a load splitter. As a simplified example, such information may state (to the effect) packets belonging to FlowID 3 are to be delivered to ServerID S5. While this technique works well for handling topology changes in the upstream tier connected to a single load splitter, it does not scale well because the same information needs to be available at other load splitters so those load splitters know where to forward packets belonging to flows that may include packets that were or will be handled by another load splitter.

Under the embodiments herein, since packets are forwarded using distribution functions in combination with schemes that adapt the distribution functions in view of system topology changes, each load splitter can forward packets to the appropriate servers without requiring flow state information to be shared, or even requiring advance knowledge of such flow state information.

Figure 1F:
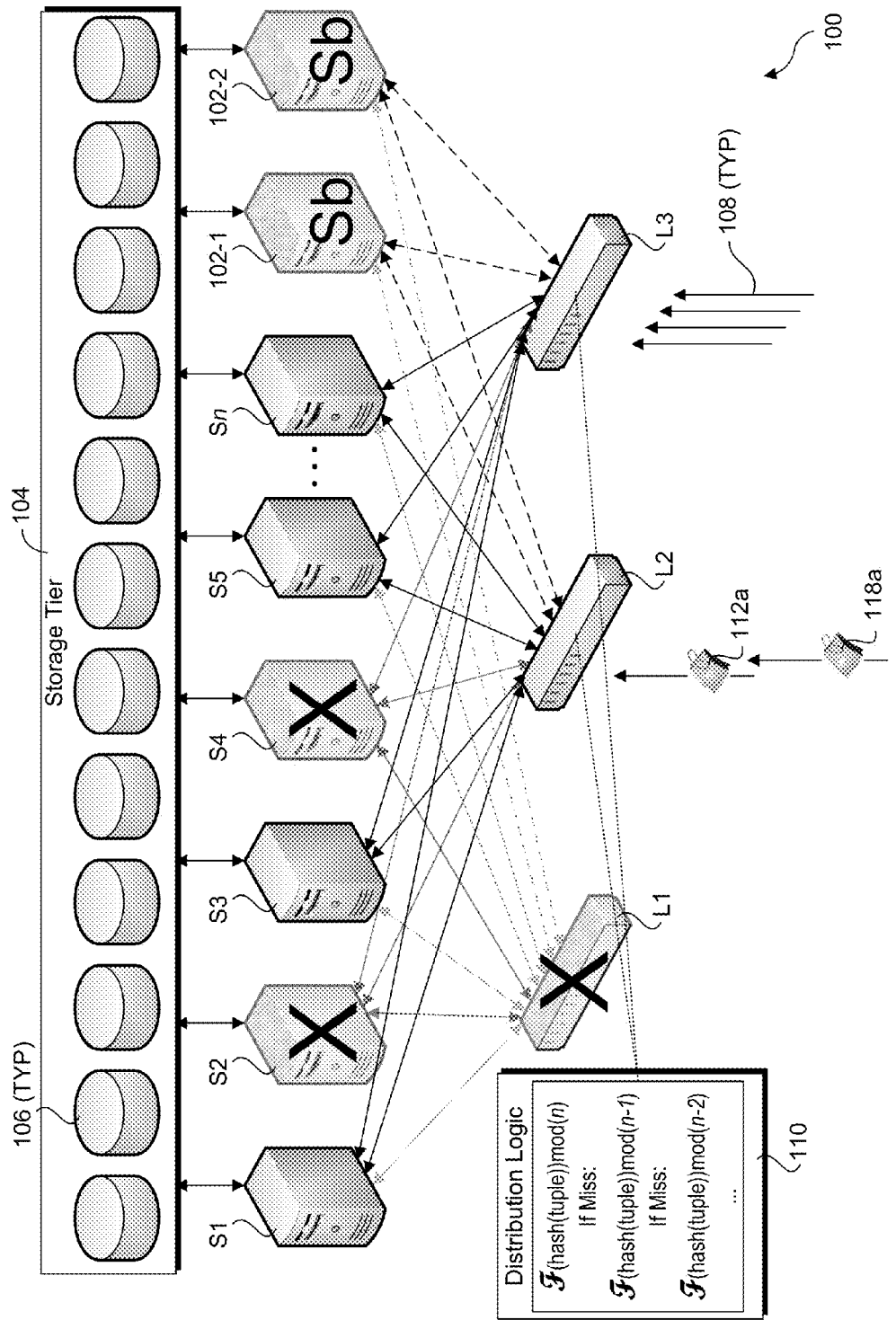
FIG. 1f shows a change in the system topology of FIG. 1c under which one of the load splitters becomes unavailable.

An example of this functionality is illustrated in FIG. 1*f*, which depicts load splitter L1 as failed and unavailable to forward incoming packets. As depicted by packets 112*a* and 118*a*, packets associated with flows that were previously handled by load splitter L1 before it became unavailable (e.g., packets 112 and 118) are now depicted as being handled by load splitter L2. Since each of load splitters L1 and L2 employ the same distribution functions and logic, load splitter L2 will forward the same packet to the appropriate server assigned to handle the flow to which the packet is associated. Moreover, under situations requiring redistribution, both load splitters L1 and L2 will redistribute packets corresponding to the same flow to the same server. Although not shown, load splitter L3 is also configured to forward packets to the appropriate servers in a similar manner.

In addition to implementation on load splitters, aspects of the embodiments may be more generally implemented on any type of network switching or forwarding element that distributes and/or forwards packets using flows under which packets associated with the same flow are distributed and/or forwarded out the same network port toward the same next hop (if another network element) or to the same endpoint (e.g., server, computer, etc.).

In addition to implementations using a physical load splitter or other physical switching element, the techniques may also be deployed in virtual environments such as those commonly used in data centers and server farms. For example, a server platform may be configured to receive packets from a network and distribute those packets to multiple virtual server instances hosted by the server platform. Under this type of implementation, the switching element is implemented in software as a virtual switch, load splitter, load balancer, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software or firmware executed by a processor or NPU on a load splitter. Thus, embodiments of this invention may be used as or to support a software program, software modules, firmware, and/or distributed software executed upon some form of processing core (such as a processor or NPU, or one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented by a load splitter configured to receive incoming packets and distribute the packets to a plurality of servers coupled to the load splitter, the method comprising:
  detecting that n servers are available to receive packets, wherein n is at least 3;
  employing an n-way distribution function to distribute packets to the n servers, wherein the n-way distribution function is configured such that packets belonging to the same flow are distributed to the same server;
  detecting that a first of the n servers is unavailable to receive packets, leaving n−1 available servers;
  while there are n−1 available servers,
    in response to receiving a first packet,
      classifying the first packet to associate the first packet with a flow; and
      performing the n-way distribution function on the packet;
    if the result of the n-way distribution function directs the first packet to be distributed to an available server, forwarding the first packet to the available server;
    if the result of the n-way distribution function directs the first packet to be distributed to the first unavailable server,
      employing an (n−1)-way distribution function to determine an available server to redistribute the first packet to and forwarding the first packet to that server;
      storing indicia indicating that packets associated with the flow for the first packet belong to a redistributed flow; and
  when the number of available servers returns to n servers, forwarding subsequently received packets associated with the redistributed flow to the same server the first packet was redistributed to.

2. The method of claim 1, further comprising:
  in response to receiving a packet,
    initializing an integer i=n;
    (a) performing an i-way distribution function to identify a server to distribute or redistribute the packet to;
    (b) if the result of the i-way distribution function identifies an available server, determining whether the packet is associated with a redistributed flow for the available server; and
      i. if the packet is associated with a redistributed flow for the available server decrementing i by 1 and returning to (a); otherwise,
      ii. forwarding the packet to the available server;
    (c) if the result of the i-way distribution function identifies an unavailable server, storing indicia indicating that packets belonging to a flow associated with the packet belong to a redistributed flow and decrementing i by 1 and returning to (a); and
    (d) repeating operations (a), (b), (b)i and (c), as applicable, until the i-way distribution function identifies an available server in operation (b) that does not have a redistributed flow for which the packet is associated.

3. The method of claim 2, further comprising:
  for each received packet, performing a flow classification operation to identify a flow the packet is to be associated with, the flow having a flow identifier (FlowID); and
  employing the FlowID as an input to the i-way distribution function.

4. The method of claim 3, further comprising employing the FlowIDs for flows that are redistributed as the indicia indicating that packets associated with those flows are redistributed flows.

5. The method of claim 2, further comprising:
  employing a redistributed flow list for a server for which flows are redistributed, wherein,
  in operation (c) a redistributed flow entry is added to the redistributed flow list for the server containing indicia indicating that packets associated with the flow are redistributed to another server;
  in operation (b), determining whether the packet is associated with a redistributed flow for the available server by determining a flow for which the packet is associated and performing a lookup against the redistributed flow list for the server to determine whether there is an entry matching the flow for which the packet is associated; and
  in operation (b) i, updating a timestamp for the redistributed flow entry corresponding to the redistributed flow for which the packet is associated.

6. The method of claim 2, further comprising:
  employing a pair of Bloom filters for storing bit vector data that is configured to facilitate confirmation to whether a flow comprises a redistributed flow for a server associated with the pair of Bloom filters;
  periodically recycling a current Bloom filter by replacing it with a next Bloom filter, wherein the next Bloom filter becomes a new current Bloom filter and the bit vector data in the current Bloom filter is cleared and it becomes the new next Bloom filter;
  in operation (c) bits are set in both the current and next Bloom filters associated with the unavailable server indicating that packets associated with the flow are redistributed to another server;
  in operation (b), determining whether the packet is associated with a redistributed flow for the available server by determining a flow for which the packet is associated and performing a lookup against the current Bloom filter for the server to determine whether there is an entry matching the flow for which the packet is associated; and
  in operation (b) i, setting bits in the next Bloom filter indicating that packets associated with the flow are redistributed to another server.

7. The method of claim 1, further comprising:
  while the number of servers is less than n servers;
    maintaining redistributed flow indicia containing data identifying, for each of multiple servers that is currently or was unavailable, which flows are being or were redistributed away from the server to another server,
  when the number of available servers returns to n servers, in response to receiving a next packet,
    classifying the next packet to associate the next packet with a flow and performing the n-way distribution function on the packet;

checking the redistributed flow indicia for the server identified by the n-way distribution function; and, if the flow associated with the next packet is a flow identified by the redistributed flow indicia, redirecting the packet to the server packets associated with the flow are being redistributed to.

8. The method of claim 1, further comprising maintaining at least one redistributed flow list containing data identifying, for each of multiple servers that is currently or was unavailable, which flows are being or were redistributed away from the server to another server.

9. The method of claim 1, further comprising employing at least one Bloom filter for storing bit vector data that is configured to facilitate confirmation to whether a flow comprises a redistributed flow for a server associated with the at least one Bloom filter.

10. The method of claim 9, further comprising:

employing at least one pair of Bloom filters for storing bit vector data that are configured to facilitate identification of flows that have been redistributed;

for each pair of Bloom filters, populating the bit vector data in the Bloom filters in a manner offset in time, wherein a Bloom filter that has been least recently cleared is designated a current Bloom filter and the other Bloom filter designated a next Bloom filter;

periodically promoting the next Bloom filter to become a new current Bloom filter and recycling the current Bloom filter to be employed as a new next Bloom filter, wherein recycling a current Bloom vectors clears its bit vector data; and performing flow identification hit testing against the Bloom filter that is the current Bloom filter.

11. The method of claim 9, further comprising:

associating a pair of Bloom filters for each of a plurality of servers;

for each pair of Bloom filters, designating a status of one of the Bloom filters a current Bloom filter and a status of the other Bloom filter a next Bloom filter, wherein the status of each Bloom filter is periodically cycled between the current Bloom filter status and the next Bloom filter status, initially populating, for a first time period, only a first current Bloom filter with bit vector data in response to detection of flows that are redistributed away from the server associated with the pair of Bloom filters while the server is unavailable during the first time period;

(a) for a next time period, populating both the first current Bloom filter and first next Bloom filter with bit vector data in response to detection of flows that are redistributed away from the server during the next time period;

(b) after a next time period completes, promoting the first next Bloom filter as a new current Bloom filter and recycling the first current Bloom filter to be employed as a new next Bloom filter, wherein the bit vector data for a Bloom filter is cleared when the Bloom filter is recycled; and repeating operations (a) and (b) on an ongoing basis.

12. The method of claim 1, further comprising:

maintaining at least one redistributed flow list containing data identifying, for each server that is currently or was unavailable, at least a portion of which flows are being or were redistributed away from the server to another server; and employing, for each server that is currently or was unavailable, at least one Bloom filter for storing bit vector data that is configured to facilitate confirmation to whether a flow comprises a flow that is currently or was redistributed away from a server associated with the Bloom filter containing the bit vector data.

13. An apparatus, comprising:

a plurality of upstream network ports;

at least one downstream network port;

wherein the apparatus is configured to be installed in a system and to be implemented as a load splitter that distributes packets received at the at least one downstream port to a number of servers communicatively coupled to the plurality of upstream ports, wherein an initial number of servers is n, the apparatus further configured, when installed in the system and operating, to perform operations including, in response to receiving a packet, initializing an integer i=n;

identifying a flow the packet is to be associated with;

(a) performing an i-way distribution function to identify a server to distribute or redistribute the packet to;

(b) if the result of the i-way distribution function identifies an available server, determining whether the packet is associated with a redistributed flow for the available server; and i if the packet is associated with a redistributed flow for the available server decrementing i by 1 and returning to (a); otherwise, ii forwarding the packet to the available server;

(c) if the result of the i-way distribution function identifies an unavailable server, storing indicia indicating that packets belonging to the flow the packet is associated with belong to a redistributed flow, decrementing i by 1, and returning to (a); and (d) repeating operations (a), (b), (b)i and (c), as applicable, until the i-way distribution function identifies an available server in operation (b) that does not have a redistributed flow for which the packet is associated, resulting in the packet being forwarded to the available server in (b)ii.

14. The apparatus of claim 13, wherein the apparatus is further configured, when installed in the system and operating, to perform operations including:

for each received packet, performing a flow classification operation to identify a flow the packet is to be associated with, the flow having a flow identifier (FlowID);

employing the FlowID as an input to the n-way and (n−1)-way distribution functions; and tracking redistributed flows associated with packet that are redistributed using the FlowIDs for the redistributed flows.

15. The apparatus of claim 13, wherein the apparatus is further configured, when installed in the system and operating, to track flows that have been redistributed using at least one redistributed flow list containing data identifying, for each server that is currently or was unavailable, which flows are being or were redistributed away from the server to another server when the server is or was unavailable.

16. The apparatus of claim 15, wherein the apparatus is further configured, when installed in the system and operating, to:

add a redistributed flow entry in operation (c) to the redistributed flow list for the server containing indicia indicating that packets associated with the flow are redistributed to another server;

determine whether the packet is associated with a redistributed flow for the available server in operation (b) by determining a flow for which the packet is associated and performing a lookup against the redistributed flow list for the server to determine whether there is an entry matching the flow for which the packet is associated;

in operation (b) i, update a timestamp for the redistributed flow entry corresponding to the redistributed flow for which the packet is associated; and remove a redistributed flow entry if the time difference between its timestamp and the current time exceeds a predetermined value.

17. The apparatus of claim 13, wherein the apparatus is further configured, when installed in the system and operating, to employ at least one Bloom filter for each server that is currently or was unavailable, the at least one Bloom filter storing bit vector data that is configured to facilitate confirmation to whether a flow has been redistributed away from a server associated with a Bloom filter.

18. The apparatus of claim 17, wherein the apparatus is further configured, when installed in the system and operating, to perform operations including:

associating a pair of Bloom filters for each of a plurality of servers operatively coupled to the upstream network ports;

for each pair of Bloom filters, designating a status of one of the Bloom filters as a current Bloom filter and a status of the other Bloom filter a next Bloom filter, wherein the status of each Bloom filter is periodically cycled between the current Bloom filter status and the next Bloom filter status, initially populating, for a first time period, only a first current Bloom filter with bit vector data in response to detection of flows that are redistributed away from the server associated with the pair of Bloom filters while the server is unavailable during the first time period;

(a) for a next time period, populating both the first current Bloom filter and first next Bloom filter with bit vector data in response to detection of flows that are redistributed away from the server during the next time period;

(b) after a next time period completes, promoting the first next Bloom filter as a new current Bloom filter and recycling the first current Bloom filter to be employed as a new next Bloom filter, wherein the bit vector data for a Bloom filter is cleared when the Bloom filter is recycled; and repeating operations (a) and (b) on an ongoing basis.

19. The apparatus of claim 18, wherein the apparatus is further configured, when installed in the system and operating, to:

in operation (c), set bits in both the current and next Bloom filters associated with the unavailable server indicating that packets associated with the flow are redistributed to another server;

in operation (b), determine whether the packet is associated with a redistributed flow for the available server by performing a lookup against the current Bloom filter for the server to determine whether there is an entry matching the flow for which the packet is associated; and in operation (b) i, set bits in the next Bloom filter indicating that packets associated with the flow are redistributed to another server.

20. The apparatus of claim 17, wherein the apparatus is further configured, when installed in the system and operating, to:

maintain at least one redistributed flow list containing data identifying, for each server that is currently or was unavailable, at least a portion of which flows are being or were redistributed away from the server to another server;

in response to receiving a first packet of a flow, if the i-way distribution function for the packet identifies an unavailable server, determine whether there is any space available in the redistributed flow list for the unavailable server to add a new redistributed flow entry; and if there is space available, add a new redistributed flow entry corresponding to the flow for the first packet to the redistributed flow list; otherwise add bit vector data to the current and next Bloom filters associated with the unavailable server to indicate the flow is a redistributed flow.

21. The apparatus of claim 13, wherein the apparatus further comprises:

a processor, having one or more processing elements;

at least one memory, operatively coupled to the processor;

a storage device, having instructions stored therein configured to be executed on the processor to cause the recited operations to be performed when the apparatus is installed in the system and operating.

22. The apparatus of claim 13, wherein the apparatus further comprises a management network port, and the apparatus is configured, when installed in a system employing a second apparatus having a similar configuration, to share information with the second apparatus concerning redistributed flows.

23. A tangible non-transient machine-readable medium having instructions stored thereon configure to be executed by at least one processing element on a load splitter to enable the load splitter to effect packet distribution and redistribution operations when the load splitter is installed in a system and operating, the packet distribution and redistribution operations comprising:

in response to receiving a packet, initializing an integer i=n;

identifying a flow the packet is to be associated with;

(a) performing an i-way distribution function to identify a server to distribute or redistribute the packet to;

(b) if the result of the i-way distribution function identifies an available server, determining whether the packet is associated with a redistributed flow for the available server; and i. if the packet is associated with a redistributed flow for the available server decrementing i by 1 and returning to (a); otherwise, ii. forwarding the packet to the available server;

(c) if the result of the i-way distribution function identifies an unavailable server, storing indicia indicating that packets belonging to the flow the packet is associated with belong to a redistributed flow, decrementing i by 1, and returning to (a); and (d) repeating operations (a), (b), (b)i and (c), as applicable, until the i-way distribution function identifies an available server in operation (b) that does not have a redistributed flow for which the packet is associated, resulting in the packet being forwarded to the available server in (b)ii.

24. The tangible non-transient machine-readable medium of claim 23, wherein the instructions are configured to perform further operations, upon execution, comprising:

for each received packet, performing a flow classification operation to identify a flow the packet is to be associated with, the flow having a flow identifier (FlowID) or retrieving a FlowID associated with the packet that was generated through a previous flow classification operation;

employing the FlowID as an input to the i-way distribution function; and tracking redistributed flows associated with packet that are redistributed using the FlowIDs for the redistributed flows.

25. The tangible non-transient machine-readable medium of claim 23, wherein the instructions are configured to perform further operations, upon execution, comprising tracking flows that have been redistributed using at least one redistributed flow list containing data identifying, for each server that is currently or was unavailable, flows that are being or were redistributed when the server is or was unavailable.

26. The tangible non-transient machine-readable medium of claim 25, wherein the instructions are configured to perform further operations, upon execution, comprising:

adding a redistributed flow entry in operation (c) to the redistributed flow list for the server containing indicia indicating that packets associated with the flow are redistributed to another server;

determining whether the packet is associated with a redistributed flow for the available server in operation (b) by determining a flow for which the packet is associated and performing a lookup against the redistributed flow list for the server to determine whether there is an entry matching the flow for which the packet is associated;

in operation (b) i, updating a timestamp for the redistributed flow entry corresponding to the redistributed flow for which the packet is associated; and removing a redistributed flow entry if the time difference between its timestamp and the current time exceeds a predetermined value.

27. The tangible non-transient machine-readable medium of claim 23, wherein the instructions are configured to perform further operations, upon execution, comprising employing at least one Bloom filter for each server that is currently or was unavailable, the Bloom filters storing bit vector data that is configured to facilitate confirmation to whether a flow has been redistributed away from a server associated with a Bloom filter.

28. The tangible non-transient machine-readable medium of claim 27, wherein the instructions are configured to perform further operations, upon execution, comprising:

associating a pair of Bloom filters for each of a plurality of servers operatively coupled to the upstream network ports;

for each pair of Bloom filters, designating a status of one of the Bloom filters a current Bloom filter and a status of the other Bloom filter a next Bloom filter, wherein the status of each Bloom filter is periodically cycled between the current Bloom filter status and the next Bloom filter status, initially populating, for a first time period, only a first current Bloom filter with bit vector data in response to detection of flows that are redistributed away from the server associated with the pair of Bloom filters while the server is unavailable during the first time period;

(a) for a next time period, populating both the first current Bloom filter and first next Bloom filter with bit vector data in response to detection of flows that are redistributed away from the server during the next time period;

(b) after a next time period completes, promoting the first next Bloom filter as a new current Bloom filter and recycling the first current Bloom filter to be employed as a new next Bloom filter, wherein the bit vector data for a Bloom filter is cleared when the Bloom filter is recycled; and repeating operations (a) and (b) on an ongoing basis.

29. The tangible non-transient machine-readable medium of claim 27, wherein the instructions are configured to perform further operations, upon execution, comprising:

in operation (c), setting bits in both the current and next Bloom filters associated with the unavailable server indicating that packets associated with the flow are redistributed to another server;

in operation (b), determining whether the packet is associated with a redistributed flow for the available server by performing a lookup against the current Bloom filter for the server to determine whether there is an entry matching the flow for which the packet is associated; and in operation (b) i, set bits in the next Bloom filter indicating that packets associated with the flow are redistributed to another server.

30. The tangible non-transient machine-readable medium of claim 27, wherein the instructions are configured to perform further operations, upon execution, comprising:

maintaining at least one redistributed flow list containing data identifying, for each server that is currently or was unavailable, at least a portion of which flows are being or were redistributed away from the server to another server;

in response to receiving a first packet of a flow, if the i-way distribution function for the packet identifies an unavailable server, determining whether there is any space available in the redistributed flow list for the unavailable server to add a new redistributed flow entry; and if there is space available, adding a new redistributed flow entry corresponding to the flow for the first packet to the redistributed flow list; otherwise adding bit vector data to the current and next Bloom filters associated with the unavailable server to indicate the flow is a redistributed flow.

* * * * *